United States Patent [19]

Dallavalle et al.

[11] Patent Number: 4,767,908

[45] Date of Patent: Aug. 30, 1988

[54] PLASMA ARC WELDING AND CUTTING TORCH DESIGNED FOR NON-TRANSFERRED AND TRANSFERRED ARC OPERATION

[75] Inventors: Silvano Dallavalle, Castel S. Pietro; Raffaele Ansaloni, S. Lazzaro di Savena, both of Italy

[73] Assignee: Cebora S.p.A., Italy

[21] Appl. No.: 14,486

[22] Filed: Feb. 13, 1987

[30] Foreign Application Priority Data

Feb. 27, 1986 [IT] Italy ................................ 3344 A/86

[51] Int. Cl.[4] ................................................ B23K 9/00

[52] U.S. Cl. .............................. 219/121.5; 219/130.4; 219/75; 219/121.54; 219/121.57

[58] Field of Search ................. 219/121 PT, 121 PW, 219/121 PO, 121 PP, 121 PQ, 74, 75, 130.4, 130.21, 130.31

[56] References Cited

U.S. PATENT DOCUMENTS 3,558,973 1/1971 Pochert et al. .............. 219/121 PW
4,567,346 1/1986 Marhic ........................ 219/121 PW
4,580,032 4/1986 Carkhuff ...................... 219/121 PW
4,598,191 7/1986 Marhic et al. ............... 219/121 PW
4,663,512 5/1987 Kneeland et al. ............ 219/121 PT

*Primary Examiner*—M. H. Paschall
*Attorney, Agent, or Firm*—Darby & Darby

[57] ABSTRACT

The invention relates to a torch for plasma arc welding and cutting operations carried out on metal, which comprises a hollow grip, to which two power supply conductors are connected together with tubes supplying plasma-forming gas and coolant, a cylindrical electrode rigidly attached to the forward end of the grip and wired to the negative pole of the power supply, and a tapered nozzle positioned forward of the electrode and fitted to a metal sleeve which is wired to the positive pole of the power supply, ensheathed by insulating material, and capable of sliding in relation to the electrode. Plasma-forming gas is injected into a space between the electrode and the sleeve, channelled through to a constricting chamber accommodating the tip of the electrode, and ionized by an arc struck between the electrode and the nozzle before being projected from the orifice in the nozzle.

8 Claims, 1 Drawing Sheet

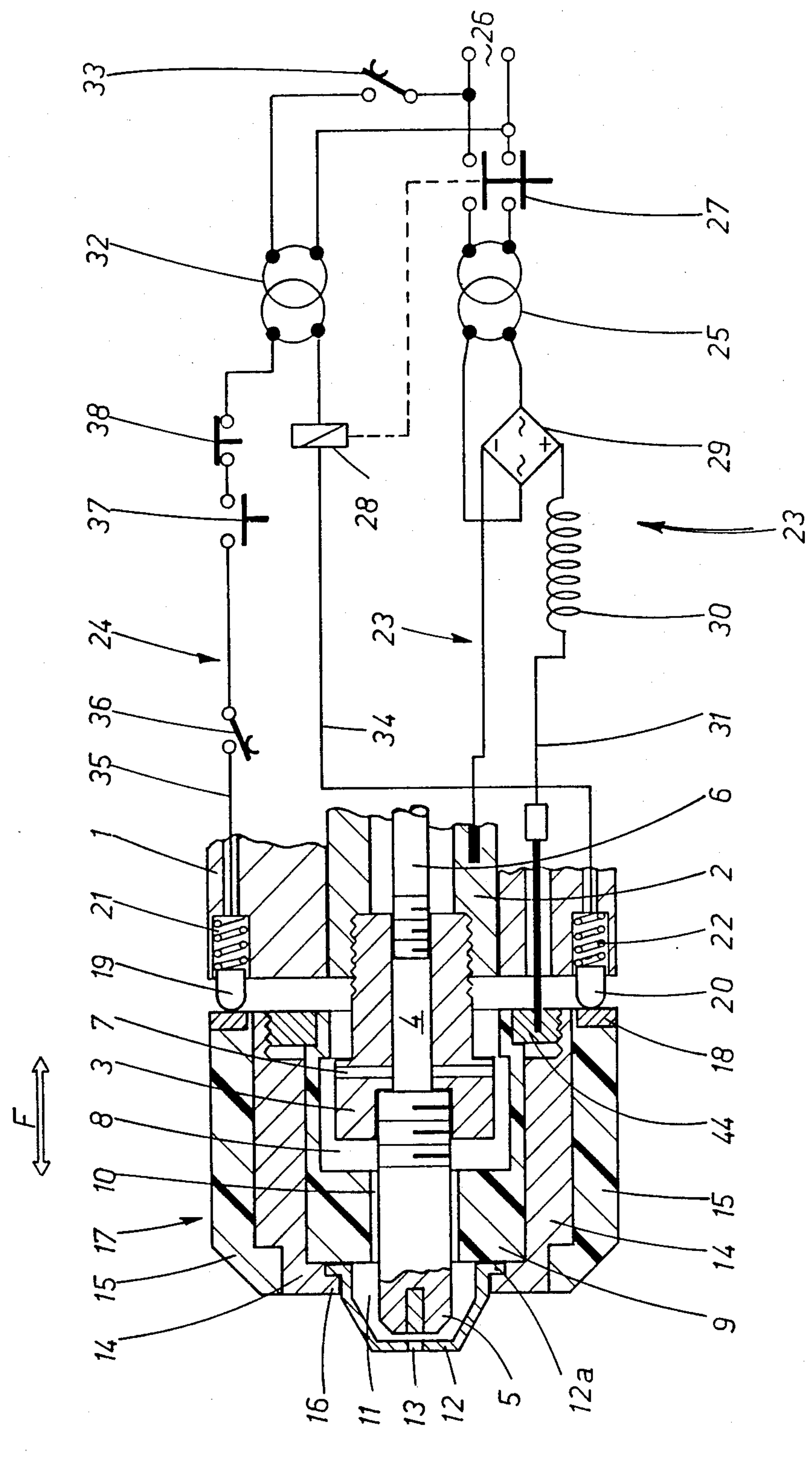
~26
33
27
32
25
38
29
37
28
23
24
23
30
36
34
31
35
6
1
2
21
22
19
20
7
18
4
3
44
F
8
10
15
17
14
15
14
9
16
11
13
12
5
12a

PLASMA ARC WELDING AND CUTTING TORCH DESIGNED FOR NON-TRANSFERRED AND TRANSFERRED ARC OPERATION

BACKGROUND OF THE INVENTION

The invention relates to a torch for use in plasma arc welding or cutting operations, employing either a non-transferred or a transferred arc.

The prior art embraces designs wherein a cylindrical electrode is attached rigidly to the plasma torch and connected to the negative pole of the electrical power supply by a conductor. The anode takes the form of a cap, likewise rigidly attached to the torch, which covers the projecting end of the electrode. The cap is insulated from the electrode, and connects with the positive pole of the power supply via a second conductor, a fine gap being created between cap and electrode through which plasma-forming gas is directed under pressure toward an orifice in the cap itself; the pierced cap thus constitutes a constricting nozzle.

In a first conventional type of torch, an arc is struck between the positive nozzle and the negative electrode utilizing a particularly high auxiliary voltage, which in most instances will be generated by complex and costly high frequency circuitry to which the torch is connected by long, heavily insulated cable.

What occurs, in practice, is that one generates a spark between the electrode and the nozzle, which occupy fixed positions in relation to one another; an arc is struck, and continues to discharge until such time as the control button or power supply switch is operated. Accordingly, the arc is struck between components of the torch, and not transferred to the work.

The expedient most widely adopted to permit transferred arc operation of such a torch is that of connecting the work (welding or cutting) to the same positive terminal as that to which the nozzle return lead is connected, and wiring-in a resistance between the return lead and terminal. Thus, when the torch is moved toward the weld or cut, the arc encounters less resistance from the work than from the return lead, and jumps across to the work.

The same effect can be produced by wiring-in switch contacts, rather than a resistance, which will be broken when the weld or cut is commenced.

In a second conventional type of torch, the arc is struck between the electrode and the work; here, the electrode is rigidly attached to and shielded by the torch and connected to the negative terminal of the power supply, whereas it is the work to be welded or cut, and not the nozzle, that is connected to the positive terminal.

The cap, or nozzle, is no longer rigidly attached in this type of torch, and an arc is struck by bringing the nozzle into momentary contact with the electrode and the work, sandwiching it swiftly between the two and then releasing. This physical contact between electrode, nozzle and work short-circuits power through the torch, whereupon, with the electrode distanced from the nozzle, the gap created between electrode and nozzle produces an arc, and the arc is transferred from the electrode to the work.

It will be appreciated that good initial contact between nozzle and work is a fundamental requirement in plasma welding or cutting with a transferred arc; this in turn dictates that the work must offer a sufficiently clean surface, signifying that a certain amount of preparation is called for, particularly where there may be rust, old paintwork, etc. . .

Transferred arc equipment must therefore incorporate special safety circuits to prevent high voltage from reaching the electrode unless the electrode itself is faultlessly positioned for operation, i.e. in contact with the work; without such a precaution, the high welding voltage would invest the operator, who will normally be in physical contact with the work.

Such a safety feature is set forth in EP No. 159256, which discloses the interposition of a low voltage circuit between the electrode and the work to be welded or cut, or rather, between the two relative terminals, the output signal from which operates a control medium designed to switch the main high voltage circuit into safe condition.

With this type of protection, the operator can proceed to transfer the arc in absolute safety, and the conventional on/off button can be eliminated from the torch; all that remains is for the operator to move the torch toward the work and establish the requisite contact between electrode, nozzle and workpiece.

The object of the invention disclosed is that of embodying a plasma welding/cutting torch which is safe to use, and which will permit of operating in non-transferred arc conditions without the need for costly ignition systems with high frequency circuits that are typical of conventional embodiments.

SUMMARY OF THE INVENTION

The stated object is achieved with a plasma arc welding and cutting torch as described and claimed herein; a torch according to the invention features simple construction and ensures reliable operation by reason of the fact that the high voltage circuit is encapsulated in the torch, and remains totally isolated from the work and from the external parts of the torch itself.

A further advantage of the torch disclosed is that it can be used for transferred arc welding/cutting operations without any modification being necessary.

BRIEF DESCRIPTION OF THE DRAWINGS

The invention will now be described in detail, by way of example, with the aid of the accompanying drawing, in which the electrode and nozzle assembly and electrical circuits of the torch are illustrated schematically in section and by symbols, respectively.

DESCRIPTION OF THE PREFERRED EMBODIMENT

In the drawing, 1 denotes part of the body of the torch, which is embodied in insulating material and fashioned into a grip. 2 denotes an internally threaded sleeve, located inside the grip, into which an externally threaded cylindrical element is screwed; this cylindrical element constitutes the electrode holder 3, and has an axial bore 4 one end of which is stopped by the electrode 5 itself, once screwed into place, the other end connecting with a tube 6 through which plasma-forming gas is supplied to the torch. Radial holes 7 depart from the bore 4 and emerge into an annular space 8 that surrounds the electrode 5 and its holder 3 and is encompassed by a hollow annular insulator 9.

The electrode 5 is inserted axially through the insulator 9 in such a way that axial passages 10 are created, between the two components, connecting the annular space 8 with a chamber 11 that surrounds the tip of the electrode 5 and is encompassed by a cap 12.

13 denotes an orifice located at the center of the cap.

The electrode insulator 9 fits snugly into a metal sleeve 14, this in its turn surrounded by an outer sheath 15, which will also be embodied in insulating material.

The metal sleeve 14 exhibits an internal lip 16 that serves to hold the flanged rim 12*a* of the cap 12 in position, between the inside of the lip 16 and the insulator 9.

The insulator 9, cap 12, sleeve 14 and sheath 15 together constitute the nozzle assembly, denoted 17, of a torch according to the invention, which is able to slide longitudinally (arrow F) in relation to the electrode 5 and its holder 3 between one position, in which the cap 12 makes contact with the tip of the electrode 5, and another position in which the cap 12 is distanced from the tip of the electrode 5.

18 denotes a slip ring which is let into the end of the insulating sheath 15 nearest the grip 1, and engaged by two spring loaded contacts 19 and 20 that are seated in axially disposed pockets 21 formed in the grip 1 itself. The two contacts 19 and 20 are urged permanently against the slip ring 18 by their springs 22, and will be provided with stops to keep them in their pockets 21 when the nozzle assembly 17 is removed.

The electrical circuitry which operates the torch comprises a power circuit and an auxiliary circuit, denoted 23 and 24 respectively.

The power circuit comprises a transformer 25 the primary winding of which is connected to the power supply 26 via the contacts 27 of a remote control switch 28 wired into the auxiliary circuit 24; the secondary winding of the transformer 25 is connected to a rectifier bridge 29. The positive output from the bridge 29 connects, by way of a choke 30, and a lead 31 running longitudinally through the grip 1, with the metal sleeve 14 of the nozzle assembly 17, the connection being effected by way of a locknut 44 screwed into the sleeve 14.

The auxiliary circuit 24 incorporates a low voltage transformer 32 the primary winding of which is connected to the power supply 26 by way of a main switch 33.

It is to the secondary winding of this low voltage transformer 32 that the two spring loaded contacts 19 and 20 are connected, by way of relative leads 34 and 35 running through the grip 1, and respective switches; more exactly, the connection denoted 34 is made and broken by the remote control switch 28 already mentioned, whereas the connection denoted 35 incorporates a set of three switches 36, 37 and 38, the first 36 of which interlocked to a push button depressed by the operator to activate the torch, the second 37 interlocked to a sensor which monitors pressure of the gas entering through the tube 6, and the third 38 (normally closed) constituting part of a cutout that breaks the circuit in the event of thermal overload occurring at the power transformer.

Operation of the torch will now be described.

Having thrown the main switch 33, and the switch 37 controlling the flow of plasma-forming gas to the torch, the operator depresses the push button 36 to energize the remote control switch 28 and make the power circuit at the contacts denoted 27; power is thus supplied to the high voltage transformer 25. At this juncture, the nozzle 17 can be offered to the work and pressed against the surface to be cut or welded; the cap 12 is brought into contact with the electrode 5, and a short-circuit occurs between the choke and the negative terminal of the rectifier bridge.

Drawing the nozzle 17 back from the work at this point, pressure of the gas inside the chamber 11 distances the cap 12 from the electrode 5, and an arc is struck between electrode and nozzle; the gas escaping through the orifice 13 is thus ionized by contact with the arc, producing the heat necessary to weld or cut the work at which it is directed.

Releasing the push button, and thus breaking the contacts denoted 36, the remote control switch 28 will be de-energized, breaking the power supply contacts 27 and extinguishing the arc.

It will be observed that the power circuit shuts off automatically in the event either of a cut in the gas supply, or of thermal overload, regardless of the position of the button 36, as the remote control switch 28 de-energizes when the auxiliary circuit 24 is broken by the relative switch 37 or 38.

An essential feature of the torch according the invention, regarding use with a non-transferred arc, is that there is no connection between the electrical power source and the work; accordingly, there is no danger of the operator's coming into contact with live components.

Another feature of the torch disclosed is the advantageous embodiment of the nozzle assembly 17, which is such that its removal from the torch automatically breaks the auxiliary circuit 24 and inhibits operation of the power circuit 23; also, the nozzle assembly 17 is readily detachable from the rest of the torch, thereby permitting easy replacement of those parts most liable to wear—i.e. electrode and cap.

The drawing is indicative of a variety of options in ultimate embodiment; for instance, the force by which the cap 12 is distanced from the electrode 12 might be produced not only by the pressure of gas flowing into the chamber 11, but also by suitable springs located between the nozzle assembly 17 and the grip 1.

What is claimed:

1. A plasma arc welding and cutting torch comprising:
- a hollow grip connected to a source of plasma-forming gas;
- a fixed electrode, fitted axially to said grip;
- an electrical power supply having a negative pole wired to said fixed electrode and a positive pole;
- a nozzle assembly, fitted to said grip coaxially, detachable therefrom, and comprising a cap wired to said positive pole of said power supply, said nozzle assembly being axially slidable with respect to said electrode so as to permit said cap and electrode to be brought into contact, said cap having an exit opening through which said plasma gas is projected;
- auxiliary control means, including an operator controlled switch, for energizing said electrical power supply; and
- security means, associated with said nozzle assembly and disposed electrically in series in said auxiliary control means for connecting or opening said auxiliary control means when said nozzle assembly is respectively fitted to or removed from said grip.

2. Torch as in claim 1, wherein the nozzle assembly comprises a hollow insulator, fitted into a metal sleeve the external surface of which is covered by a sheath of insulator material, and the internal surface of which affords a seat for retention of the cap.

3. Torch as in claim 2 wherein one of said insulator parts of said nozzle assembly supports a slip ring impinged upon by two contacts, said slip ring and contacts comprising said security means by which said auxiliary control means is connected and opened.

4. Torch as in claim 1, wherein said electrical power supply is enabled by operation of the contacts of a remote control switch, which switch is wired into said auxiliary control means and is energized by said operator controlled switch.

5. Torch as in claim 4, wherein said auxiliary control means comprises further series-wired switches, one of which is governed by the pressure of said plasma-forming gas, and the other of which is interlocked to a means for monitoring temperature in said power supply.

6. Torch as in claim 3, wherein the contacts are slidably accommodated in respective axial pockets offered by the grip, and urged against the slip ring by spring means.

7. Torch as in claim 1, wherein the hollow grip comprises an element with an axial bore connecting at one end with a tube carrying the plasma-forming gas and at the remaining end with a set of radial holes, fashioned in the element itself, that emerge into an annular space which surrounds the electrode and is encompassed by the nozzle assembly.

8. Torch as in claim 4 wherein said power supply and said auxiliary control means are served by respective power and auxiliary transformers, and wherein a main power switch is wired to a primary winding of the auxiliary transformer, and the contacts of the remote control switch enabling the power supply are wired to the primary winding of the power transformer.

* * * * *